United States Patent [19]
Harris et al.

[11] Patent Number: 4,671,965
[45] Date of Patent: Jun. 9, 1987

[54] METHOD FOR THERMALLY PEELING PRODUCE CONTINUOUSY AT HIGH TEMPERATURES AND LOW PRESSURES

[76] Inventors: Hubert Harris, 259 Opelika Rd.; Durward A. Smith, 1623 Wrights Mill Rd., both of Auburn, Ala. 36830

[21] Appl. No.: 878,299

[22] Filed: Jun. 25, 1986

[51] Int. Cl.⁴ .......................... A23P 1/00; A23N 7/00
[52] U.S. Cl. ...................................... 426/482; 99/584; 426/511
[58] Field of Search ............... 426/481, 482, 511, 447; 99/568, 584, 518, 483

[56] References Cited
U.S. PATENT DOCUMENTS 3,870,809  3/1975  Green et al. ......................... 426/482
4,322,444  3/1982  Zuilichem et al. .................. 426/482

Primary Examiner—George Yeung
Attorney, Agent, or Firm—Thad G. Long

[57] ABSTRACT

A method for the rapid removal of the peelings or outer coverings from certain food products with minimal loss of or damage to the other portions thereof, by a thermal shock treatment comprising a brief exposure of said products simultaneously to high intensity radiant heat from a vessel and high temperature, low pressure superheated steam or other fluid or gaseous medium inside the vessel.

64 Claims, 2 Drawing Figures

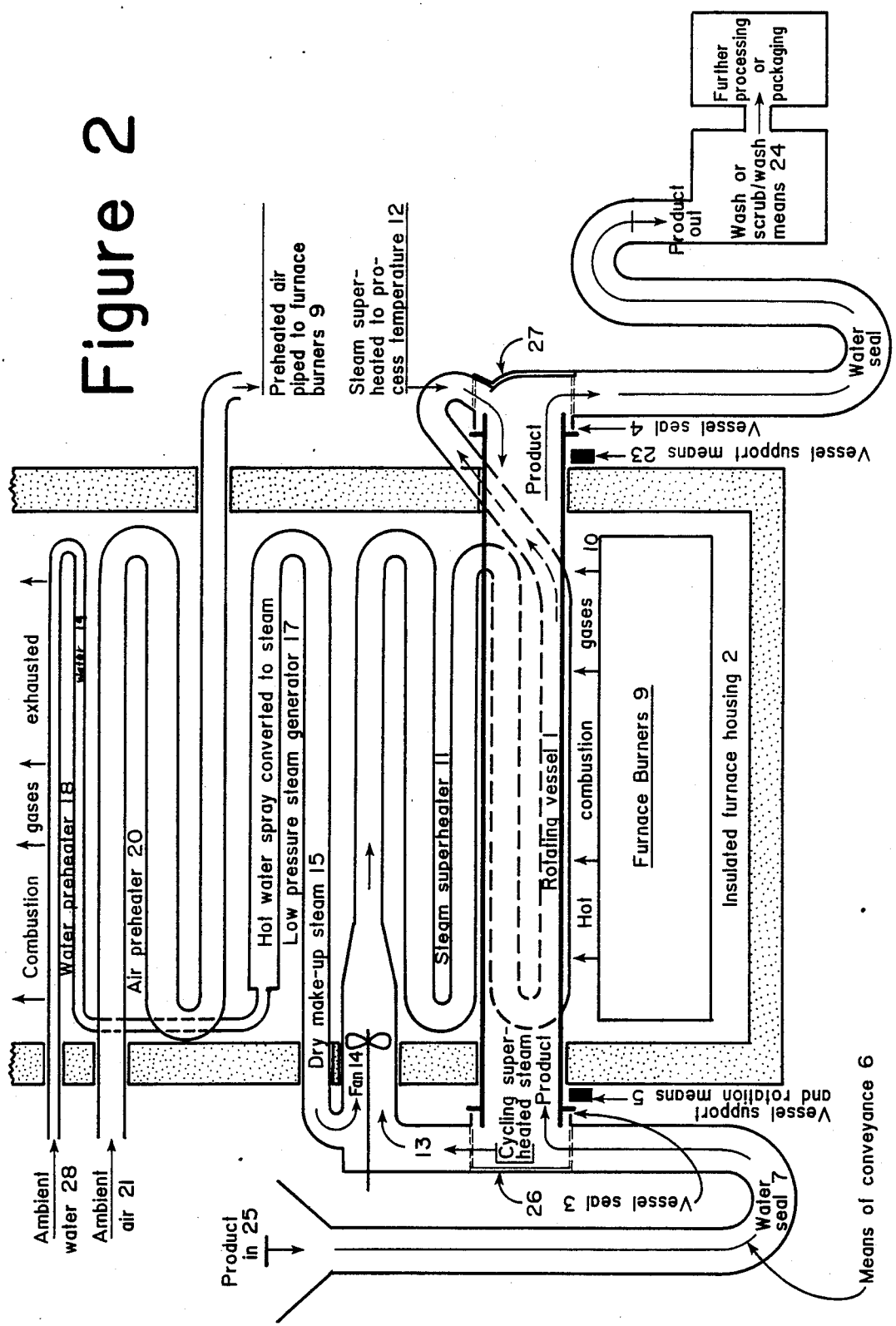

4,671,965

METHOD FOR THERMALLY PEELING PRODUCE CONTINUOUSY AT HIGH TEMPERATURES AND LOW PRESSURES

BRIEF SUMMARY OF THE INVENTION

Most of man's foods in natural state are protected with a covering of one kind or another. Examples are the peel tissues of fruits and vegetables, hulls of legume seed pods, shuck covering of corn ears, skins of onions, shells of nuts, scales of fish, and the calcareous coverings of shellfishs. In most cases, these coverings are considered to be unedible and are therefore eliminated when preparing the product of human consumption.

The food industry currently employs a variety of methods and techniques for removing the unedible surface coverings from food products. The exact methods or combination of methods used varies with the product to be processed, size of operation and other factors. Methods and techniques currently in use include mechanical peeling with power operated knives, abrasive peeling, flame peeling, scalding, mechanical shelling of legume crops, mechanical cracking of nuts, mechanical shelling of shrimp. Adequate washing and varying amounts of scrubbing, sorting, and hand trimming are required to complete the operations.

The thermal shock process as disclosed herein is distinctively different from any of the current commercial processes. It is related to conventional pressurized steam peeling in that steam is utilized in both processes. The manner in which the steam is utilized and the end results are vastly different.

There are two common commercial types of steam peeling methods. In the first of these methods, vegetables are charged through a rotary-type sluice gate batcher into a hermetically sealed chamber and are processed under a pressure of 50-90 psig (3.5-6.3 Kg/cm$^2$) during 40-90 seconds. While being processed by steam, the vegetables are displaced along the chamber by a screw conveyor, from the point of charging to the point of discharge. The vegetables are then discharged through a sluice gate batcher into a washing and peeling machine in which they are mechanically peeled (FMC Continuous High Pressure Steamers Models 140 and 240 FMC Catalog (1980) pp. 49-50). The second peeling method utilizes a high pressure batch-type steam vessel which is filled from above, purged with steam for several seconds and hermetically sealed prior to a gradual pressure build up. Pressures up to 300 psig (21. Kg/cm$^2$) during 20-60 seconds are used. The exhaust valve is then opened requiring several seconds for the pressure to gradually fall, and before the discharge hatch can be opened. the produce is then discharged on a conveyor and is conveyed to a washer where the peeling is mechanically completed (U.S. Pat. No. 4,091,772). A further steam peeling method has been described, but is not utilized by the industry, whereby the produce to be peeled is conveyed by gravity through a system of chambers separated by hydraulically actuated gate valves. In the process the produce moves from an atmospheric chamber to a low pressure steam environment to a vacuum chamber (U.S. Pat. No. 3,759.166).

The prior methods and apparatus for processing vegetables by steam are disadvantageous because following processing and due to slow venting of the pressure vessel the surface layers of the produce are excessively heated. The heat continues penetrating inside, thereby increasing the depth of the layer being treated, which results in large amounts of by-product and correspondingy higher peeling and trimming losses. These methods are most applicable for processing vegetables of a hard consistency (potatoes for example). Fruit and vegetables of delicate consistency are not well peeled in such methods because they quickly begin to cook and become soft and/or are sensitive to high pressures which disrupt their structural integrity. The following prior U.S. patents are also known to applicants: U.S. Pat. Nos. 1,243,724, 1,433,928, 1,793,711, 1,910,749, 2,806,501, 2,873,220, 3,128,690, 3,225,804, 3,276,495, 3,605,843, 3,714,886, 3,880,066, 3,959,506, 4,222,322, 1,328,547, 2,267,747, 3,959,504, 4,064,794, 2,116,212, 2,490,112, 3,971,303, 4,393,756 and British Pat. No. 1,395,108. The latest patents on removal of coverings from food products known to applicants are their own two patents on the "thermal blast" process, U.S. Pat. No. 4,524,681, and U.S. Pat. No. 4,569,850.

The inventions covered by the applicants' two "thermal blast" patents embody a novel process for the rapid removal of outer coverings from food products with minimal damage protions of the product. These results are achieved by the employment of a heat-blast treatment with superheated steam or high temperature gases and high pressures. The process has proven to be very effective in removing the outer coverings from many products. In some cases it has also aided substantially in the removal of other unedible portions such as: cores from pimiento peppers; "rag" from pecans; fins, head, and entrails of fish and shellfish or silks from corn.

The blast process is accomplished by holding the product for a brief period in a heated, closed vessel filled with superheated steam under elevated pressure, and then instantaneously releasing the pressure. During the holding period, thermal energy is transferred at a very fast rate to the moisture just beneath the outer covering of the product. The very fast heating rate results from simultaneous exposure of the product surface to two sources of heat: namely direct contact with pressurized, superheated steam and radiant heat from the hot vessel walls. The heat moves at a very fast rate from the relatively dry outer surface of the product to moisture immediately beneath the surface. Becoming highly energized, this moisture flashes to the vapor state when the pressure surrounding the product is suddenly released. The rapidly expanding vapor causes an explosive process which blasts the outer peel, pod, shuck, skin, scale, or shell from the product under treatment. Loss of edible portion is minimal and the exposed surface is smooth and attractive.

The thermal blast process is, in reality, a phenomenon based on the thermodynamic properties of water. When the essential conditions are met, an explosion results which blasts the covering from the product.

The thermal blast process has proven to be effective in removing the covering from a wide variety of food products including fruits, vegetables, nuts, fish and shellfish. By varying the temperature and/or time of heating, excellent results have been obtained in removing coverings ranging from the very thin peel of a ripe peach to the relatively thick peel of an orange.

While the method disclosed herein regarding the present invention has certain common features with the "thermal blast" patents, there are a number of important differences. Their common feature is that they both utilize radiant heat from the walls of a vessel and contact heat from a fluid or gaseous medium simultaneously for rapid surface heating of the product. A major difference is that the present "thermal shock" invention utilizies relatively low pressures compared with pressures used in the "thermal blast" patents, and generally higher temperatures for the superheated steam or other fluid or gaseous medium. The use of lower pressures in the present invention limits somewhat the range of products on which the invention is effective, but has the advantage of allowing efficient and continuous peeling to proceed, rather than having to accomplish the peeling in discrete individual batches. Differences between the present invention and the "thermal blast" patents are set out in Table I below.

food products, somewhat less thoroughly than in the case of the thermal blast inventions. However, for relatively thin-skinned food products, the thermal shock method of the present invention achieves excellent results in accomplishing the desired peeling. Depending upon the thickness of the peeling and the degree of ripeness of the fruits or vegetables being processed, some follow-up washing or scrub-washing may be desirable to remove completely all of the loosened peeling to the extent not already removed by the thermal shock method. However, such washing or scrub-washing is minimal in comparison with other known peeling methods, except the thermal blast method, and generally leaves the subsurface matter of the food products with-

TABLE I

COMPARISON OF THERMAL BLAST AND THERMAL SHOCK PROCESSES

| Items of Comparison | Thermal Blast Process | Thermal Shock Process |
|---|---|---|
| Product Adaption | Effective in blasting the peel, pod, shuck, skins, scale or shell from many vegetable and animal products. | Effective only in peeling certain products with relatively thin skins that separate easily from the edible portion, by thermal shock treatment at low pressure. |
| Properties of Superheated steam | 30 to 100 psig pressures and 400 to 800° F. temperatures. | Pressure not greater than 30 psig, preferably 0 to 10 psig pressures; 650 to 1300° F. temperatures, preferably 800 to 1000° F. |
| Flow of Product | Batch process with loading and discharge from same end of vessel. This requires tilting of vessel upward for loading and downward for discharge. Process time is lost between batches. | Product flows continuously through vessel, entering and leaving through seal means. Vessel can remain in a fixed position. Continuous flow results in higher production rate. |
| Thermal Treatment | Rapid heating of product surface followed by blast discharge. | Rapid thermal shock treatment at low pressure, followed by scrub-wash, if needed |
| Steam Use | Steam lost by exhaust to atmosphere from each batch | Steam can be recycled and supplemented with make-up steam generated in heat exchangers |
| Product discharge | Special system required for catching product during blast discharge | Product discharged gently to conventional conveyor |
| Process Noise | Muffling of blast noise is required | No unusual process noise involved |
| Controls and automation | Multiple step process increases control and automation requirements | Continuous flow process minimizes control and automation requirements |

The thermal shock method utilizes a combination of radiant heat coupled with sueprheated steam or other fluid or gaseous medium ranging in temperature from 650° F. to 1300° F., with a preferable range of 800° F. to 1000° F., at pressure levels not greater than 30 psig, with a preferable range of zero to 10 psig, into which conditions relatively thin-skinned fruits, vegetables or other food products, such as tomatoes, potatoes, peaches, pears, carrots, apples, plums, and kiwis are introduced. The sudden exposure to intense heat for a period of time ranging from 8 seconds to 75 seconds weakens the bonds between the peeling and the subsurface matter, without significant injury to the latter. Because the pressure of the superheated steam or other fluid or gaseous medium is relatively low, the pressure beneath the peeling resulting from heated moisture immediately below the surface of the peeling cannot reach an equilibrium level sufficient to "blast" the peeling off upon rapid depressurization as in the thermal blast process. However, the pressure under the peeling does aid in further weakening or destroying of the bonds holding the peeling to the subsurface matter, although less dramatically and, in the case of relatively thicker skinned out significant damage. Table II below shows the results obtained for given lengths of thermal shock processing time for a variety of food products suitable for the method of the present invention:

TABLE II

PROCESS TESTS ON THERMAL SHOCK PEELING OF FRUIT AND VEGETABLE PRODUCTS

| Product | Thermal Shock Treatment[1] | Evaluation Of Results |
|---|---|---|
| Tomato | 15[2] | Excellent peel, scrub-wash required |
| Peach | 20 | Excellent peel, needs water wash only |
| Carrot | 20 | Excellent peel separation, water wash only |
| Apple | 30 | Peel loosened, removed by scrub-wash |
| Apple | 60 | Complete peel with scrub-wash, some caramelization |
| Potato | 60 | Complete peel with wash |
| Plum | 15 | Excellent results, requiring water wash only |
| Kiwi | 60 | Peel washed off, some heating of flesh causing outer layers to break off in |

TABLE II-continued
PROCESS TESTS ON THERMAL SHOCK PEELING OF FRUIT AND VEGETABLE PRODUCTS

| Product | Thermal Shock Treatment[1] | Evaluation Of Results |
|---|---|---|
| | | places |

[1]Vessel temperature at approximately 900° F., fluid heating medium (superheated steam) at approximately 1.5 psig and 650 to 700° F. temperature
[2]Seconds process time An object of the present invention is to provide a continuous low pressure thermal process that is effective and efficient in peeling certain fruit and vegetable products that have thin skins which separate readily from the flesh when subjected to thermal shock treatment. Another object is to accomplish the thermal shock treatment by moving the product continuously through a rotating vessel in which said product is exposed simultaneously to high intensity radiant heat from the vessel wall and to high temperature, low pressure superheated steam or other fluid or gaseous medium inside the vessel, said product entering and leaving the vessel through seal means at intake and outlet ends of said vessel. A further object is to circulate the superheated steam through the vessel preferably countercurrent to product flow, and to reheat it on each cycle by passage through a heat exchanger situated adjacent to said rotating vessel. It is still a further object of the invention to situate said vessel and said heat exchanger inside an insulated furnace heated by combustion of a fuel and to include additional heat exchangers in said furnace for the purpose of recovering heat in escaping combustion gases and to utilize said heat for reheating air to furnace burners and for generating low pressure steam for use as make-up steam in the process. It is another object of the invention to reduce noise incident to certain other methods or processes.

BRIEF DESCRIPTION OF THE DRAWINGS

FIG. 2 is a flow-chart schematic diagram showing a particular implementation or application of the thermal shock method, including steps for conserving energy and maximizing efficiency.

DETAILED DESCRIPTION OF THE DRAWINGS

Figure 1:
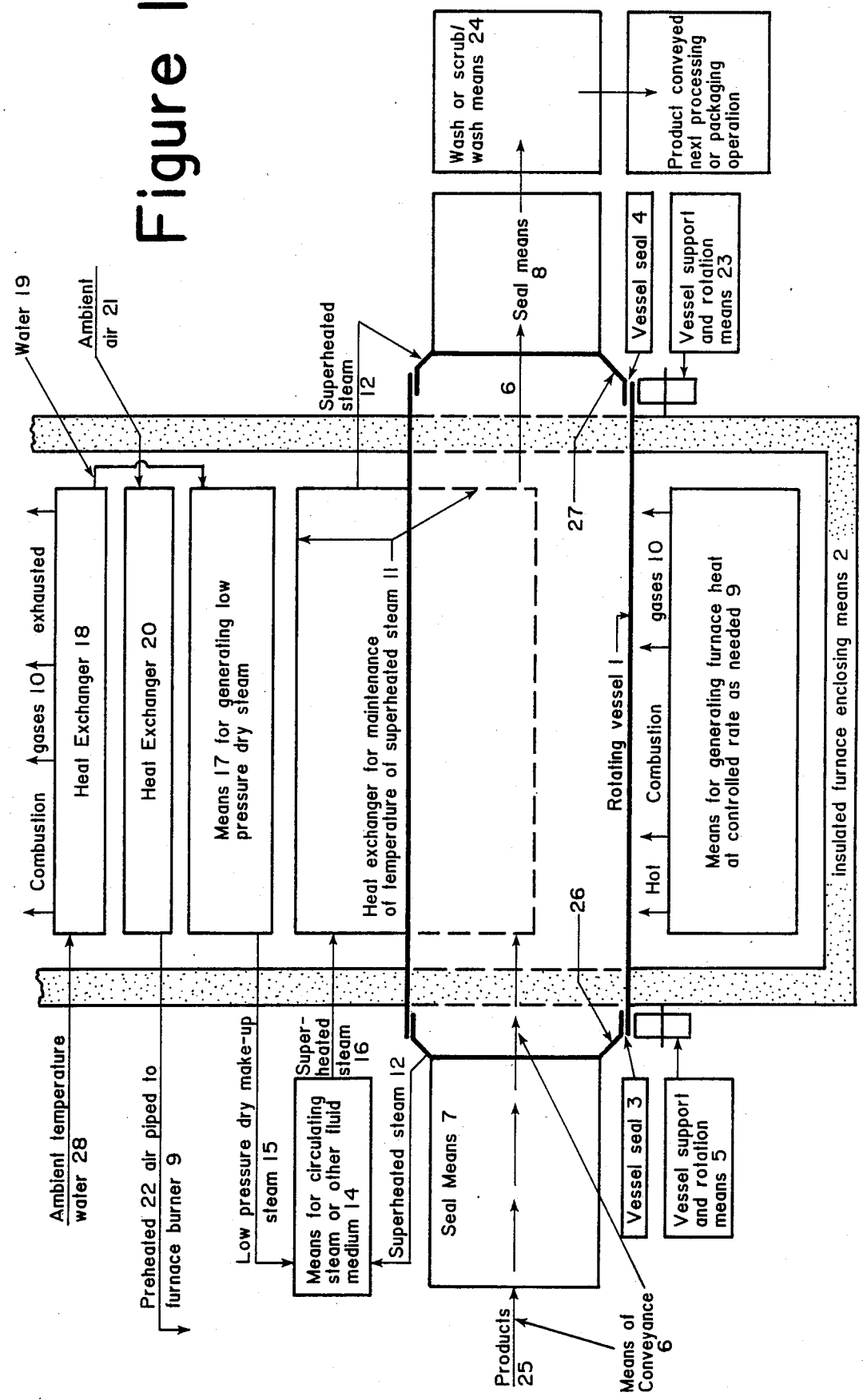
FIG. 1 is a flow-chart schematic diagram showing the thermal shock method in a general form, including steps for conserving energy and maximizing efficiency.

In FIG. 1, a vessel 1 is situated in a furnace means enclosing system 2 so that said vessel can fully rotate. Around the circumference of the said vessel 1 where it would otherwise come into contact with the stationary heads 26 and 27, there are vessel seals 3 and 4, respectively, to prevent or reduce the escape of fluid or gaseous medium (generally superheated steam) from vessel 1. A furnace means 9 heats the walls of vessel 1 as it rotates, thus producing radiant heat inside said vessel 1.

Product 25 is conveyed by means of conveyance 6 through seal means 7 into vessel 1. As product 25 is conveyed through vessel 1, vessel 1 rotates while its surface is heated by hot combustion gases 10; simultaneously, superheated steam 12 circulates through vessel 1, preferably in a direction countercurrently to the flow of product 25. After passing through vessel 1, superheated steam 12 is mixed with low pressure dry make-up steam 15 and the resulting mixture is then circulated by circulating means 14 through heat exchanger 11 and thence into vessel 1 in the manner of superheated steam 12 discussed above, conpleting the circulating cycle.

In order to provide a source of low pressure dry make-up steam 15, ambient temperature water 28 is introduced into heat exchanger 18 and herein preheated and circulated to the steam generating heat exchanger 17, therein coverted to low pressure dry make-up steam 15. Throughout the operations described above, ambient air 21 is introduced into heat exchanger 20 and therein preheated as a source of preheated air 22 circulated to the burner or burners in furnace means 9.

Product 25, having been processed in vessel 1, as aforesaid, is removed from vessel 1 by means of conveyance 6 through seal means 8 into the next phase of processing or packaging. After leaving vessel 1, product 25 would normally be washed or, if necessary, scrubwashed before moving foward for further processing or packaging.

FIG. 2 shows a more specific implementation of the thermal shock method disclosed herein. Product 25 is conveyed by a means of conveyance 6 through a water seal 7 into the rotating vessel 1, the walls of which are heated by a furnace burner 9. Superheated steam 12 is introduced into the rotating vessel, from steam superheater 11. Superheated steam in vessel 1 is mixed with dry make-up steam 15 and recycled back into steam superheater 11 by means of fan 14, thence returned to vessel 1 as superheated steam 12. Make-up steam 15 is provided by introducing ambient water 28 into water preheater 18 and then water 19 is circulated to low pressure steam generator 17, to form dry make-up steam 15. Ambient air 21 is taken into air preheater 20, heated, and then circulated to furnace burners 9.

In both FIGS. 1 and 2, the walls of vessel 1 are maintained at temperature levels of 650° F. to 1300° F. and the superheated steam is maintained at temperature levels of 650° F. to 1300° F., with preferable temperature ranges for the vessel walls and the superheated steam being in the 800° F. to 1000° F. range. Pressures of the superheated steam can range up to 30 psig, but are preferably in the range of zero to 10 psig. The combination of radiant heat from the walls of vessel 1, and the contact heat from the superheated steam and the pressure from the superheated steam synergistically destroy or substantially weaken the bonds between peelings and the underlying substance of food products of relatively thin peelings, i.e., generally less than 1/32 inch in thickness. Such weakening or destroying of said bonds is accomplished in a matter of seconds, quickly enough to prevent damage to the food product matter beneath the peeling. The results of typical tests are shown in Table II above. The relatively low pressures utilized in the present invention make possible continuous processing which would not be feasible under very high pressure conditions. It is found that low pressures can be maintained without sacrificing the desirable feature of continuity in an assembly-line type processing operation, such as in a commerical food processing plant. In general, for relatively thin-skinned fruits and vegetables, excellent results are obtained. The degree of ripeness of the fruit or vegetable being processed can affect the utility of the invention herein disclosed with respect to peelings having thicknesses near the upper limits of the invention's effectiveness. In general, the peelings of riper fruits and vegetables are less firmly bonded to the underlying fruit or vegetable matter beneath the peeling and can thus be removed by the herein disclosed invention more readily than peelings of less ripe fruits and vegetables. Hence, in the case of ripe fruits and vegetables, thicker peelings can practically be removed than in the case of less ripe fruits and vegetables.

The recycling of superheated steam exhausted from vessel 1 back into superheater 11 (or, in the case of FIG. 1, heat exchanger 11) via fan 14 or circulating means 14 is not an essential part of the basic invention but makes the invention more efficient by conserving energy. Air preheater 20 likewise is not an essential part of the invention but makes the invention more efficient. Further energy efficiencies could be achieved by inserting baffles suspended between stationary heads 26 and 27 to direct superheated steam within vessel 1 more precisely at the product 25 as it is processed in vessel 1. The insulated furnace housing 2 is not essential to the basic invention but makes the invention more efficient by conserving energy.

Seals 7 and 8 may be any of many known types. Water seals 7 and 8 are shown in FIG. 2, but other possible types of seals would be a rotating cylinders, screws, and various types of valves.

Superheated steam is the preferable fluid or gaseous medium through which contact heat may be transmitted, inasmuch as it consists of water vapor which is inexpensive, plentiful, non-toxic and holds heat well in the temperature ranges utilized in the instant invention. However, any fluid or gaseous medium may be used which retains heat well in the temperature ranges utilized herein and which is non-toxic and permits pressure variations in the ranges utilized in this invention.

Washing or scrub-washing the product 25, as in wash or scrub-wash means 24, is not an essential part of the basic invention, but it can be useful in removing residues of peelings and can be an efficient and effective means of improving the appearance of the fruits and vegetables prior to further processing or packaging.

There are various well known heat exchangers and air pre-heaters available on the market which can perform the functions of the equipment designated 11, 17, 18 and 20 on FIGS. 1 and 2.

Both FIGS. 1 and 2 show the superheated steam 12 circulated into vessel 1 in a direction counter to the flow of product 25 through vessel 1. Such countercurrent flow of the superheated steam is preferable because it maximizes the temperature to which the product 25 is exposed as it leaves vessel 1 near the end of processing. This results from the fact that product 25 enters vessel 1 at ambient temperatures and the peel (product cover) will thus be hottest at the moment product 25 leaves vessel 1 at the discharge end thereof, at which moment the superheated steam 12 entering vessel 1 will also be hottest. However, the invention will work, though less effectively, if the superheated steam were introduced into vessel 1 at substantially the same location as product 25 and circulated parallel to the flow of product 25 through vessel 1.

What is claimed is:

1. A method for peeling thin-skinned food products selected from the group consisting of fruits and vegetables with minimal loss of or damage to edible portions thereof, said method comprising the steps of:
   (a) subjecting said food products to radiant heat in the temperature range of 650° F. to 1300° F. and simultaneously subjecting said food products to contact heat from a fluid or gaseous medium in the temperature range of 650° F. to 1300° F.;
   (b) maintaining pressure on said food products in a range not greater than 30 psig through said fluid or gaseous medium;
   (c) maintaining the aforesaid conditions set forth in steps (a) and (b) above with respect to said food products for a predetermined period of time, ranging from 8 seconds to 75 seconds sufficient to loosen the thin peelings of said food products; and
   (d) immediately thereafter eliminating the aforesaid conditions set forth in steps (a) and (b) so that said food products are subjected substantially to ambient temperatures and atmospheric pressures.

2. The method in claim 1, wherein the conditions set forth in steps (a) and (b) take place in a vessel.

3. The method in claim 2, wherein said vessel is a cylinder.

4. The method in claim 2, wherein said vessel is rotatable.

5. The method in claim 2, wherein said vessel is a rotatable cylinder.

6. The method in claim 4, wherein said rotatable vessel has stationary heads at each end thereof.

7. The method in claim 5, wherein said rotatable cylinder has stationary heads at each end thereof.

8. The method in claim 6, wherein one or more baffles are suspended between said stationary heads within said rotatable vessel, said baffle or baffles arranged to direct downwardly any fluid or gaseous medium within said rotatable vessel.

9. The method in claim 7, wherein one or more baffles are suspended between said stationary heads within said rotatable vessel, said baffle or baffles arranged to direct downwardly any fluid or gaseous medium within said rotatable vessel.

10. The method in claim 2, wherein one or more seal means are provided for said vessel, through which seal means said food products can be introduced into said vessel and withdrawn from said vessel without materially altering the conditions within said vessel set forth in said steps (a) and (b).

11. The method in claim 10, wherein said vessel is a cylinder.

12. The method in claim 10, wherein said vessel is rotatable.

13. The method in claim 10, wherein said vessel is a rotatable cylinder.

14. The method in claim 12, wherein said rotatable vessel has stationary heads at each end thereof.

15. The method in claim 13, wherein said rotatable cylinder has stationary heads at each end thereof.

16. The method in claim 14, wherein one or more baffles are suspended between said stationary heads within said rotatable vessel, said baffle arranged to direct downwardly any fluid or gaseous medium within said rotatable vessel.

17. The method in claim 15, wherein one or more baffles, are suspended between said stationary heads within said rotatable cylinder, said baffle or baffles arranged to direct downwardly any fluid or gaseous medium within said rotatable cylinder.

18. The method in claim 10, wherein one of said seals means permits entry of said food products into an area of said vessel near one end thereof and another of said seal means permits withdrawal of said food products from an area of said vessel near the other end thereof.

19. The method in claim 18, wherein said vessel is a cylinder.

20. The method in claim 18, wherein said vessel is rotatable.

21. The method in claim 18, wherein said vessel is a rotatable cylinder.

22. The method in claim 20, wherein said rotatable vessel has stationary heads at each end thereof.

23. The method in claim 21, wherein said rotatable cylinder has stationary heads at each end thereof.

24. The method in claim 22, wherein one or more baffles are suspended between said stationary heads within said rotatable vessel, said baffle or baffles arranged to direct downwardly any fluid or gaseous medium within said rotatable vessel.

25. The method in claim 23, wherein one or more baffles are suspended between said stationary heads within said rotatable cylinder, said baffle or baffles arranged to direct downwardly any fluid or gaseous medium within said rotatable vessel.

26. The method in claim 2, wherein the said radiant heat comes from the walls of said vessel which in turn have absorbed heat from a source of heat external to said vessel.

27. The method in claim 26, wherein said vessel is a cylinder.

28. The method in claim 26, wherein said vessel is rotatable.

29. The method in claim 27, wherein said cylinder is rotatable.

30. The method in claim 28, wherein said rotatable vessel has stationary heads at each end thereof.

31. The method in claim 29, wherein said rotatable cylinder has stationary heads at each end thereof.

32. The method in claim 30, wherein one or more baffles are suspended between said stationary heads within said rotatable vessel, said baffle or baffles arranged to direct downwardly any fluid or gaseous medium within said rotatable vessel.

33. The method in claim 31, wherein one or more baffles are suspended between said stationary heads within said rotatable cylinder, said baffle or baffles arranged to direct downwardly any fluid or gaseous medium within said rotatable cylinder.

34. The method in claim 26, wherein the source of heat external to said vessel is hot combustion gases from a furnace.

35. The method in claim 34, wherein said vessel is a cylinder.

36. The method in claim 34, wherein said vessel is rotatable.

37. The method in claim 35, wherein said cylinder is rotatable.

38. The method in claim 36, wherein said rotatable vessel has stationary heads at each end thereof.

39. The method in claim 37, wherein said rotatable cylinder has stationary heads at each end thereof.

40. The method in claim 38, wherein one or more baffles are suspended between said stationary heads within said rotatable vessel, said baffle or baffles arranged to direct downwardly any fluid or gaseous medium within said rotatable vessel.

41. The method in claim 39, wherein one or more baffles are suspended between said stationary heads within said rotatable cylinder, said baffle or baffles arranged to direct downwardly any fluid or gaseous medium within said rotatable cylinder.

42. The method in claim 36, wherein said rotatable vessel rotates over said furnace so as to maintain the walls of said vessel at a substantially uniform temperature.

43. The method in claim 37, wherein said rotatable cylinder rotates within said furnace so as to maintain the walls of said cylinder at a substantially uniform temperature.

44. The method in claim 38, wherein said rotatable vessel rotates within said furnace so as to maintain the walls of said vessel at a substantially uniform temperature.

45. The method in claim 39, wherein said rotatable cylinder rotates within said furnace so as to maintain the walls of said cylinder at a substantially uniform temperature.

46. The method in claim 40, wherein said rotatable vessel rotates within said furnace so as to maintain the walls of said vessel at a substantially uniform temperature.

47. The method in claim 41, wherein said rotatable cylinder rotates within said furnace so as to maintain the walls of said cylinder at a substantially uniform temperature.

48. The method of claim 1, wherein said fluid or gaseous medium is superheated steam.

49. The method of claim 44, wherein said fluid or gaseous medium is superheated steam.

50. The method of claim 49, wherein said superheated steam is supplied by a heat exchanger.

51. The method of claim 45, wherein said fluid or gaseous medium is superheated steam.

52. The method of claim 51, wherein said superheated steam is supplied by a heat exchanger.

53. The method of claim 46, wherein said fluid or gaseous medium is superheated steam.

54. The method of claim 53, wherein said superheated steam is supplied by a heat exchanger.

55. The method of claim 47, wherein said fluid or gaseous medium is superheated steam.

56. The method of claim 55, wherein said superheated steam is supplied by a heat exchanger.

57. The method of claim 50, wherein superheated steam from said vessel is recycled to said heat exchanger and mixed with make-up steam from another heat exchanger and thereafter recirculated through said vessel.

58. The method of claim 52, wherein superheated steam from said cylinder is recycled to said heat exchanger and mixed with make-up steam from another heat exchanger and thereafter recirculated through said cylinder.

59. The method of claim 54, wherein superheated steam from said vessel is recycled to said heat exchanger and mixed with make-up steam from another heat exchanger and thereafter recirculated through said vessel.

60. The method of claim 56, wherein superheated steam from said cylinder is recycled to said heat exchanger and mixed with make-up steam from another heat exchanger and thereafter recirculated through said cylinder.

61. The method of claim 57, wherein a means of conveyance moves said food products through one said seal means into said vessel, through said vessel in said predetermined time, and then out of said vessel through the other said seal means.

62. The method of claim 58, wherein a means of conveyance moves said food products through one said seal means into said cyclinder, through said cylinder in said predetermined time, and then out of said cylinder through the other said seal means.

63. The method of claim 59, wherein a means of conveyance moves said products through one said seal means into said vessel, through said vessel in said predetermined time, and then out of said vessel through the other said seal means.

64. The method of claim 60, wherein a means of conveyance moves said food products through one said seal means into said cylinder, through said cylinder in said predetermined time, then out of said cylinder through the other said seal means.

* * * * *